United States Patent Office 3,214,341
Patented Oct. 26, 1965

3,214,341
PROLONGED ACTION MEDICAMENT
Wolffe Harry Feinstone, 121 Yates Road, Memphis, Tenn.
No Drawing. Filed Jan. 15, 1962, Ser. No. 166,352
1 Claim. (Cl. 167—82)

This invention relates to drugs, and methods of their preparation and administration.

Many drugs occur in, or can be converted to a water soluble basic salt form. These drugs also are commonly known in the forms of soluble salts of strong acids such as chlorides, hydrochlorides, sulfates, bromides, phosphates and the like. They are most commonly administered in one of these latter forms, either orally or by injection. It has long been recognized that these soluble salts reach the blood stream quickly to produce a high initial blood level followed by a rapid decline in blood level concentration. This leads to wide variation in the blood level concentration in terms of time, the need for frequent administration, and a serious lack of control. For example, if, for some reason, the soluble salt is not removed from the blood in the short interval normally required, the administration of another dose is likely to produce excessive concentration.

Accordingly, the need for prolonged, steady release of water soluble salt-forming drugs has long been recognized. It has been common practice to coat active materials with varying thicknesses and types of relatively insoluble material or to imbed the soluble materials in resinous substances. The effectiveness of these dosage forms has been dependent to a large degree upon the person to whom they have been administered, and to the skill with which the preparations have been prepared. Either because of the chemistry of the individual, or the variation in the preparation of the compositions, or both, there has been a great variation in the rate of disintegration of such preparation with a resultant variation in the release of the medicinal agent into the person's blood stream. This sometimes results in a dangerous overdosage, because too much of the medicament is released in a short time, and in other cases, results in no treatment at all because the preparation is frequently so slowly disintegrated that it passes entirely through the alimentary canal without substantial release of the active medicament.

One of the objects of this invention is to provide a dosage form of medicament which provides prolonged and well controlled release of a water soluble therapeutic compound.

Another object is to provide a method of preparing such a dosage form.

Another object is to provide a method of treatment utilizing said dosage form.

Other objects will become apparent to those skilled in the art in the light of the following disclosure.

In accordance with this invention, generally stated, a therapeutic composition is provided which consists essentially of the reaction product of a basic medicinal compound and a non-toxic free acid form of a derivative of cellulose having active carboxyl groups. The composition is prepared in such a way that the reaction product is very slowly soluble in water or gastric juices, but swells to form a gelatinous material. It is administered orally.

While the theory of its operation forms no part of this invention, it is believed that, upon ingestion, the product of this invention, being wetted on the outside, becomes soft and gelatinous on its outer surface. This outer surface is removed by the action of the walls of the gastrointestinal tract, and the underlying surface then softens and swells upon contact with the liquid content of the alimentary canal until it is in turn attrited. This process is believed to continue until the dosage form is entirely dissipated.

It can be seen that, in order to provide a substantial initial dosage, the material may be pre-gelled in whole or in part, or the outer surface impregnated or otherwise enriched with a higher concentration of unreacted water soluble medicament. However, even in tabletted form, with uniform composition throughout the tablet, the active drug component is found to be rapidly available at the onset, in limited quantities, and to be released in a uniformly gradual manner over a prolonged period of time. Conversely, if a slower release is desired, additional of the free acid form of cellulose derivative, e.g., carboxymethyl cellulose, may be added after the reaction product has been formed. The addition of the free acid form to the reaction product is a different matter from reacting the basic medicament with a corresponding excess of free acid form. In the former case, unreacted free acid form is believed to provide a kind of semi-mechanical inhibitor while the swelling and gelling characteristics of the reacted product remain unchanged; in the second case, the basic material is thought to react with some of the carboxyl groups of all of the free acid form, producing quite different gelling and solubility characteristics from those obtained with the mixed product.

In compounding the product of this invention, a cellulose derivative having reactive carboxyl groups, such, for example, as carboxy methyl cellulose, carboxy methylhydroxy ethyl cellulose, carboxy ethyl cellulose, and methyl carboxy methyl cellulose, is used in the free acid form. These free acid forms are characterized by being dispersible, either as solutions or gels, when made initially from a solution of a soluble salt, but of becoming insoluble or difficulty soluble after they have been dried. In the preferred method of manufacture, the free acid form is reacted with a basic medicament, and dried. The resultant product is difficulty soluble in water, but swells to form a gelatinous mass.

Examples of basic medicaments include sympathomimetic amines, such as dl-amphetamine or d-amphetamine, which are useful in various conditions including depression, alcoholism, obesity, etc.; 1-desoxyephedrine, which is useful in nasal congestion, etc.; ephedrine, which is used in allergy syndromes, narcolepsy, nasal congestion, etc.; 1-phenylephrine and phenylpropanolamine, which are used in conditions such as allergy states, nasal congestion, etc.; antihistaminics such as d-methapyrilene, d-chlorpheniramine, phenyltoloxamine and pyrilamine, which are useful in allergy states, pruritis, nauses, etc.; anthelmintics, such as piperazine, which are useful as vermifuges or vermicides; antitrussive agents, such as dextromethorphan and carbetapentane, which are useful for preventing coughing; alkaloidal substances such as atropine, morphine, scopolamine and codeine, and others which have pharmacological properties that are well known.

The following examples, like the examples of suitable cellulose derivatives and basic medicaments given above are merely illustrative.

*Example 1*

80% dl-amphetamine was prepared by adding 2 ml. of water to 8 g. of dl-amphetamine base and mixing vigorously until homogeneous. 5 g. of dry carboxymethyl cellulose free acid was placed in a vessel and 10 parts of 80% dl-amphetamine was quickly added. The mixture was stirred slowly until the granules were thoroughly wetted. The vessel was closed and held at 50–60° C. for 15 hours. 50 ml. of hot 99% isopropanol was added and the mass was mixed well until thoroughly broken up. The granules were filtered by suction, washed with 50 ml.

portions of acetone until the last washing was practically free of unreacted base as determined by titration of an aliquot of the washing with standard acid to the methyl red endpoint, dried for 1.5 hours at 60° C. and transferred to suitable securely closed containers to prevent absorption of moisture. The dried mass weighed 7.47 g. and contained 33.8% amphetamine on an anhydrous basis.

The amount of amphetamine which may theoretically react with the carboxymethyl cellulose is determined from the neutralization equivalent of the carboxymethyl cellulose. This will vary from lot to lot but, in general, will be found to be such that the reacting amphetamine is of the order of 30-36% of the weight of the carboxymethyl cellulose-amphetamine compound. A compound containing the theoretical amount of amphetamine swells in water. It can be appreciated that, since the dried free acid of carboxymethyl cellulose is substantially insoluble and does not swell appreciably in water, if less amphetamine is reacted, the product swells less but for therapeutic amounts of amphetamine in a convenient dosage form, the product gels and is attrited satisfactorily.

The above described compound may also be made by variations of the above example, such as will occur to those skilled in the art. For example, the amphetamine base may be dissolved in any appropriate solvent and the carboxymethyl cellulose stirred into it as long as necessary, then filtered, washed, and dried as described.

*Example II*

10 g. of d-methorphan base was dissolved in 50 ml. of 80% (by volume) isopropyl alcohol. To this solution 6.25 parts of carboxymethyl cellulose free acid was added, and mixed thoroughly. The mixture was allowed to stand at 50° C. for 65 hours.

The mass was filtered by suction, and washed with 50 ml. portions of acetone until the last washing was practically free of basic reaction as determined by titration. The mass was dried at 60° C. for 2 hours and then for about 16 hours in a vacuum dessicator. The dry carboxymethyl cellulose-methorphan salt weighed 10.72 g. and contained 43.2% d-methorphan. The salt swelled in water.

Based on the neutralization equivalent of the carboxymethyl cellulose, the theoretical amount of combined d-methorphan is expected to be in the neighborhood of 51%. As stated previously, however, this will vary from lot to lot of carboxymethyl cellulose.

*Example III*

8 g. of ephedrine base was dissolved in 2 ml. of water and 1 ml. of 99% isopropanol by mixing vigorously until homogeneous. 5 g. of carboxymethyl cellulose free acid was added and stirred slowly until the granules were thoroughly wetted. The vessel was closed and held at 50° C. for 70 hours. 50 ml. of hot 99% isopropanol was added and the mass mixed until thoroughly broken up. The granules were filtered by suction and washed with 50 ml. portions of acetone until the last washing gave practically no basic reaction as determined by titration of an aliquot of the washing with standard acid to the methyl red endpoint. The mass was dried for 2 hours at 60° C., transferred to suitable containers and closed securely to prevent absorption of water. The dry carboxymethyl cellulose-ephedrine salt weighed 8.38 g. and contained 31.6% ephedrine on an anhydrous basis. The salt swelled in water.

From the neutralization equivalent of the carboxymethyl cellulose, the theoretical amount of combined ephedrine is expected to be in the neighborhood of 38%. This will vary from lot to lot of carboxymethyl cellulose.

*Example IV*

80% 1-desoxyephedrine was prepared by adding 2 ml. of water to 8 g. of 1-desoxyephedrine base and mixing vigorously until homogeneous. 8 g. of carboxymethyl cellulose free acid was placed in a vessel and 12 g. of 80% desoxyephedrine was quickly added. The mixture was stirred slowly until the granules were thoroughly wetted. The vessel was closed and held at 50° C. for 16 hours. 50 ml. of hot 99% isopropanol was added and the mass was mixed well until thoroughly broken up. The granules were filtered by suction, washed with 50 ml. portions of acetone until the last washing gave practically no basic reaction as determined by titration of an aliquot of the washing with standard acid to the methyl red endpoint, dried for 2 hours at 60° C., and transferred to suitable securely closed containers to prevent absorption of water. The dry carboxymethyl cellulose-desoxyephedrine salt weighed 12.32 g. and contained 35.0% of 1-desoxyephedrine. The salt swelled in water.

From the neutralization equivalent of the carboxymethyl cellulose, the theoretical amount of combined desoxyephedrine is in the neighborhood of 36%. This will vary from lot to lot of carboxymethyl cellulose.

*Example V*

An 80% d-chlorpheniramine dispersion was prepared by adding 2 ml. of water to 8 g. of d-chlorpheniramine base and mixing thoroughly. The materials do not form a solution. 5 g. of carboxymethyl cellulose free acid was added to the vessel, and stirred slowly until the granules were thoroughly wetted. The vessel was closed and held at 50° C. for 16 hours. 50 ml. of hot 99% isopropanol was added and the mass mixed well until thoroughly broken up. The granules were filtered by suction, washed with 50 ml. portions of acetone until the last washing gave practically no basic reaction as determined by titration of an aliquot of the washing with standard acid to the methyl red endpoint, dried for 2 hours at 60° C. and transferred to suitable securely closed containers to prevent absorption of water. The dry carboxymethyl cellulose-chlorpheniramine salt weighted 7.35 g. and contained 32% d-chlorpheniramine. The salt swelled in water.

From the neutralization equivalent of the carboxymethyl cellulose, the theoretical amount of combined d-chlorpheniramine is in the neighborhood of 51%. This will vary from lot to lot of carboxymethyl cellulose.

*Example VI*

An 80% d-methapyrilene dispersion was prepared by adding 2 ml. of water to 8 g. of d-methapyrilene base and mixing vigorously. The materials do not form a solution. 5 g. of carboxymethyl cellulose free acid was added to the vessel, and stirred slowly until the granules were thoroughly wetted. The vessel was closed and held at 50° C. for 16 hours. 50 ml. of hot 99% isopropanol was added and the mass mixed well until thoroughly broken up. The granules were filtered by suction, washed with 50 ml. portions of acetone until the last washing gave practically no basic reaction as determined by titration of an aliquot of the washing with standard acid to the methyl red endpoint. The mass was dried for 2 hours at 60° C. and transferred to suitable securely closed containers to prevent absorption of water. The dry carboxymethyl cellulose-methapyrilene salt weighed 6.87 g. and contained 27.1% of d-methapyrilene. The salt swelled in water.

From the neutralization equivalent of the carboxymethyl cellulose, the theoretical amount of combined d-methapyrilene is in the neighborhood of 49%. This will vary from lot to lot of carboxymethyl cellulose.

*Example VII*

10.2 g. of phenyltoloxamine base was dissolved in 13.75 ml. of 80% isopropanol. 6.5 g. of carboxymethyl cellulose free acid was added to the vessel and stirred slowly until the granules were thoroughly wetted. The vessel was closed and held at 50° C. for 16 hours. 50 ml. of hot 99% isopropanol was added and the mass mixed well until thoroughly broken up. The granules were filtered by suction, washed with 50 ml. portions of acetone until the last washing gave practically no basic reaction as determined by titration of an aliquot of the washing with standard acid to the methyl red endpoint, dried for 2 hours at 60° C., and transferred to suitable securely closed containers to prevent absorption of water. The dry carboxymethyl cellulose-phenyltoloxamine salt weighed 9.07 g. and container 30.6% of phenyltoloxamine on an anhydrous basis. The salt swelled in water.

From the neutralization equivalent of the carboxymethyl cellulose, the theoretical amount of combined phenyltoloxamine is in the neighborhood of 48%. This will vary from lot to lot of carboxymethyl cellulose.

*Example VIII*

8 g. of phenylpropanolamine base was dissolved in 17.5 ml. of 80% isopropanol. 5 g. of carboxymethyl cellulose free acid was added to the vessel and stirred slowly until the granules were thoroughly wetted. The vessel was closed and held at 50° C. for 40 hours. 50 ml. of hot 99% isopropanol was added and the mass mixed well until thoroughly broken up. The granules were filtered by suction, washed with 50 ml. portions of acetone until the last washing gave practically no basic reaction as determined by titration of an aliquot of the washing with standard acid to the methyl red endpoint, dried for 2 hours at 60° C., and transferred to suitable securely closed containers to prevent absorption of water. The dry carboxymethyl cellulose-phenylpropanolamine salt weighed 7.33 g. and contained 32.7% phenylpropanolamine on an anhydrous basis. The salt swelled in water.

From the neutralization equivalent of the carboxymethyl cellulose, the theoretical amount of combined phenylpropanolamine is in the neighborhood of 35%. This will vary from lot to lot of carboxymethyl cellulose.

*Example IX*

10 parts of 1-phenylephrine base was dissolved in 100 ml. of 80% isopropanol. 6.7 g. of carboxymethyl cellulose free acid was added to the vessel and stirred slowly until the granules were thoroughly wetted. The vessel was closed and held at 50° C. for 50 hours. 50 ml. of hot 99% isopropanol was added and the mass mixed well until thoroughly broken up. The granules were filtered by suction, washed with 50 ml. portions of acetone until the last washing gave practically no basic reaction as determined by titration of an aliquot of the washing with standard acid to the methyl red endpoint, dried for 2 hours at 60° C., and transferred to suitable securely closed containers to prevent absorption of water. The dry carboxymethyl cellulose-1-phenylephrine salt weighed 12.08 g. and contained 28.4% 1-phenylephrine on an anhydrous basis. The salt swelled in water.

From the neutralization equivalent of the carboxymethyl cellulose, the theoretical amount of combined phenylephrine is in the neighborhood of 38%. This will vary from lot to lot of carboxymethyl cellulose.

*Example X*

11 g. of pyrilamine base was dissolved in 18.75 ml. of 80% isopropanol. 6.9 g. of carboxymethyl cellulose free acid was added to the vessel and stirred slowly until the granules were thoroughly wetted. The vessel was closed and held at 50° C. for 40 hours. 50 ml. of hot 99% isopropanol was added and the mass was mixed well until thoroughly broken up. The granules were filtered by suction, washed with 50 ml. portions of acetone until the last washing gave practically no basic reaction as determined by titration of an aliquot of the washing with standard acid to the methyl red endpoint, dried for 2 hours at 60° C., and transferred to suitable securely closed containers to prevent absorption of water. The dry carboxymethyl cellulose-pyrilamine salt weighed 10.82 g. and contained 31.1% of pyrilamine on an anhydrous basis. The salt swelled in water.

From the neutralization equivalent of the carboxymethyl cellulose, the theoretical amount of combined pyrilamine is in the neighborhood of 51.6%. This will vary from lot to lot of carboxymethyl cellulose.

*Example XI*

11 g. of carbetapentane base was dissolved in 18.75 ml. of 80% isopropanol. 6.9 g. of carboxymethyl cellulose free acid was added to the vessel and stirred slowly until the granules were thoroughly wetted. The vessel was closed and held at 50° C. for 40 hours. 50 ml. of hot 99% isopropanol was added and the mass mixed well until thoroughly broken up. The granules were filtered by suction, then washed with 50 ml. portions of acetone until the last washing gave practically no basic reaction as determined by titration of an aliquot of the washing with standard acid to the methyl red endpoint, dried for 2 hours at 60° C., and transferred to suitable securely closed containers to prevent absorption of water. The dry carboxymethyl cellulose-carbetapentane salt weighed 9.53 g. and contained 33.2% carbetapentane on an anhydrous basis. The salt swelled in water.

From the neutralization equivalent of the carboxymethyl cellulose, the theoretical amount of combined carbetapentane is in the neighborhood of 50.0%. This will vary from lot to lot of carboxymethyl cellulose.

*Example XII*

A dispersion of carboxymethyl cellulose free acid was prepared by treating 400 g. of a 6% solution of sodium carboxymethyl cellulose with 40 g. of Amberlite Resin 1R–120 (Mallinckrodt analytical reagent), stirred at high speed for 15–30 minutes and strained through fine nylon voile. The solid on the voile was discarded. To determine the theoretical amount of pheniramine that must be used, the neutralization equivalent of the liquid was obtained by titrating an aliquot with standard sodium hydroxide. Complete removal of the sodium from the sodium carboxymethyl cellulose is demonstrated by an ash determination on the strained suspension. This should equal zero.

30 g. of the above acid carboxymethyl cellulose was weighed into a beaker, 1.376 g. of pheniramine base was added and stirred until solution was complete, and placed in an oven at 50–60° C. until dry. The dry carboxymethyl cellulose-pheniramine salt weighed 3.03 g. and contained 47.2% of pheniramine. The salt swelled in water.

Based on the neutralization equivalent of the carboxymethyl cellulose, the theoretical amount of combined pheniramine is expected to be in the neighborhood of 48%. This will vary from lot to lot of carboxymethyl cellulose.

*Example XIII*

80% d,l-desoxyephedrine was prepared by adding 2 ml. of water to 8 g. of d,l-desoxyephedrine and mixing vigorously until homogeneous. 5 g. of carboxymethyl cellulose free acid was placed in a vessel and 10 g. of 80% d,l-desoxyephedrine was added and stirred slowly until the granules were thoroughly wetted. The vessel was closed and held at 50–60° C. for 16 hours. 50 ml. of hot 99% isopropanol was added and the mass mixed well until thoroughly broken up. The granules were filtered by suction, washed with 50 ml. portions of acetone until the last washing gave practically no basic reaction as determined by titration of an aliquot of the washing with standard acid to the methyl red endpoint, dried for 2 hours at 60° C., transferred to suitable securely closed containers to prevent absorption of moisture. The dried mass weighed 7.5 g. and contained 33.3% d,l-desoxyephedrine. The salt swelled in water.

The amount of d,l-desoxyephedrine which may theoretically react with the carboxymethyl cellulose is determined from the neutralization equivalent of the carboxymethyl cellulose. This will vary from lot to lot of carboxymethyl cellulose, but is expected to be in the neighborhood of 38%.

*Example XIV*

30 g. of CMHEC-37 (carboxymethyl-hydroxyethyl cellulose with an average substitution of approximately .3 carboxymethyl and .7 hydroxyethyl) was dissolved in 500 ml. of water. The solution was cooled and 30 g. of a cationic exchange resin (Dowex 50 WX4) was added and the mixture stirred for 25 minutes. The resin was removed by centrifugation and the free acid of CMHEC-37 was precipitated with acetone. The precipitation was washed with acetone.

One half of the precipitate (21.1 g.) was dried in the air at 40° C. to remove the acetone. An amount of this compound (8 g.) equivalent to 7.472 g. dry weight was combined with 9 g. d-amphetamine in 50 ml. of 80% isopropyl alcohol and the mixture was allowed to stand overnight at 49° C.

50 ml. of isopropyl alcohol were added to the mass and thoroughly mixed. The mixture was filtered on a Büchner funnel and the residue was washed with acetone to remove the excess amphetamine. The salt was dried at 60° C. for 2 hours. The weight of the CMHEC-37 amphetamine salt, was 9.2 g. It contained:

| | Percent |
|---|---|
| Volatiles at 105° C. in 1 hour | 6.2 |
| Amphetamine by perchloric acid titration on dry basis | 13.7 |
| Theoretical amphetamine content* | 17.88 |

*The CMHEC-37 free acid required 3.22 ml. n/2 NaOH to neutralize 1 g. on the dry basis. This would be equivalent to 0.2177 g. of d-amphetamine if the reaction was complete.

*Example XV*

8 g. (equivalent to 7.472 g. dry weight) of the air-dried precipitated CMHEC-37 of Example XIV was combined with 9 g. of ephedrine in 50 ml. of 80% isopropyl alcohol, and the mixture was allowed to stand overnight at 49° C.

50 ml. of isopropyl alcohol was added to the mass and thoroughly mixed. The mixture was filtered on a Büchner funnel and the residue was washed with acetone to remove the excess ephedrine. The salt was dried at 60° C. for 2 hours. The weight of the CMHEC-37 ephedrine salt, was 9.2 g. It contained:

| | Percent |
|---|---|
| Volatiles at 100° C. for 1 hour | 6.74 |
| Ephedrine by perchloric acid titration on dry basis | 17.25 |
| Theoretical ephedrine content* | 21.0 |

* 1 g. of the free acid required 3.22 ml. of n/2 NaOH.

The salt is soluble in water.

*Example XVI*

15 g. of CMHEC-43 (carboxymethyl-hydroxyethyl cellulose with an average substitution of approximately .4 carboxymethyl and .3 hydroxyethyl) was dissolved in 350 ml. of water. The solution was cooled and 30 g. of a cationic exchange resin (Dowex 50 WX4) was added and the mixture stirred for 30 minutes. The resin was removed by centrifugation and the free acid of CMHEC-43 was precipitated with acetone. The precipitate was washed with acetone and air dried at 40° C. for 1 hour.

An amount of this precipitate (25 g.) equivalent to 8.675 g. dry weight was combined with 9 g. of d-amphetamine in 50 ml. of 80% isopropyl alcohol. The mixture was allowed to stand overnight at 49° C.

50 ml. of isopropyl alcohol were added to the mass and thoroughly mixed. The mixture was filtered on a Büchner funnel and the residue was washed with acetone to remove the excess amphetamine. The salt was dried at 60° C. for 2 hours. The weight of this CMHEC-43 amphetamine salt, was 10.65 g. It contained:

| | Percent |
|---|---|
| Volatiles at 105° in 1 hour | 8.0 |
| Amphetamine by perchloric acid titration on dry basis | 17.8 |
| Theoretical amphetamine content* | 22.4 |

* 1 g. of the CMHEC-43 free acid (dry basis) required 4.28 ml. of n/2 NaOH for neutralization. This would be equivalent to 0.2893 g. of amphetamine if the reaction was complete.

The salt is soluble in water.

*Example XVII*

25 g. (equivalent to 8.675 g. dry weight) of the air-dried precipitated CMHEC-43 of Example XVI was combined with 9 g. of ephedrine in 50 ml. of 80% isopropyl alcohol. The mixture was allowed to stand overnight at 49° C.

50 ml. of isopropyl alcohol was added to the mass and thoroughly mixed. The mixture was filtered on a Büchner funnel and the residue was washed with acetone to remove the excess ephedrine. The salt was dried at 60° C. for 2 hours. The weight of this CMHEC-43 ephedrine salt, was 10.65 g. It contained:

| | Percent |
|---|---|
| Volatiles at 100° C. for 1 hour | 9.0 |
| Ephedrine by perchloric acid titration | 21.2 |
| Theoretical ephedrine content* | 22.4 |

* 1 g. CMHEC-43 free acid 3.5 ml. of n/2 NaOH for neutralization.

The salt is soluble in water.

*Example XVIII*

15 g. of sodium methyl carboxymethyl cellulose was dissolved in 1300 ml. of boiling water. The solution was cooled and 30 g. of Amberlite Resin IR-120 (Mallinckrodt analytical reagent) was added. The mixture was stirred for 30 minutes and the resin was removed by centrifugation. The free acid of the cellulose derivative was precipitated with acetone. The precipitate was washed with acetone and dried at 50° C. for 2 hours.

5.5 g. of the dried precipitate was added to 30 ml. of a solution which contained 9 g. of d-amphetamine in 80% isopropyl alcohol. The mixture was stirred and allowed to stand overnight at 49° C. The resulting mass was washed with isopropyl alcohol and acetone to remove excess d-amphetamine. It was dried in a dessicator followed by 1 hour at 60° C. The weight was 7.4 g. It contained 21.24% volatile matter.

The non-volatile methyl carboxymethyl cellulose-d-amphetamine salt weighed 5.83 g. and contained 14.4% d-amphetamine.

From the neutralization equivalent of the methyl carboxymethyl cellulose, the theoretical amount of combined d-amphetamine is in the neighborhood of 14.5%. This may be varied in other preparations.

The salt was slowly soluble in water.

The product of this invention is preferably administered in tablet, pellet, or granular form. The latter may be enclosed in a capsule. As has been suggested heretofore, the product may be partially or wholly pre-gelatinized and the product can also be fortified either at the suface or elsewhere, with soluble medicament, or additional free acid form of carboxy cellulose can be added to the product to slow its release.

The carboxy cellulose derivatives disclosed are nontoxic and have the desired solubility and reaction characteristics. Other such derivatives may be used, provided they also have the desired solubility and reaction characteristics, and are non-toxic. Similarly, numerous other basic medicaments may be used, it being only necessary that they are of such character as to react with carboxyl groups of the cellulose derivative to form a cellulose salt which is swellable in gastro-intestinal juices.

The method of preparation, as set out in the examples, may also be varied to some extent. The time intervals for reaction, for example, were determined by experience for the particular bases indicated, at a temperature of around 50–60° C. Different bases will require different lengths of time. Higher temperatures will reduce the length of time required, but some of the reactants tend to discolor at temperatures much above 60° C., and, of course, in dealing with organic materials, it is important to avoid decomposition. Lower temperatures may be used, but the reaction time will be increased. Other organic liquids may be used for the washing and granulation, preparatory to drying. Suitable liquids are well known to those skilled in pharmaceutical and biochemical arts.

Having thus described the invention, what is claimed and desired to be secured by Letters Patent is:

The method of preparing a dosage form of a medicament composing reacting a basic form of said medicament in solution with substantially water-insoluble granules of the free acid form of a non-toxic carboxy cellulose derivative having reactive carboxyl groups, washing the reaction product until said washing gives practically no basic reaction as determined with standard acid to the methyl red endpoint, and subsequently drying the reaction product of the medicament and cellulose derivative, the proportions of medicament and cellulose derivative reacted being such as to produce at least fifty percent of the theoretical amount of medicament-cellulose derivative salt as determined from the neutralization equivalent of the cellulose derivative.

References Cited by the Examiner

UNITED STATES PATENTS

| | | | |
|---|---|---|---|
| 2,669,536 | 2/54 | Bunding | 167—74 |
| 2,824,092 | 2/58 | Thompson | 260—117 |
| 2,851,453 | 9/58 | Kennon et al. | 260—232 |
| 2,906,665 | 9/59 | Doyle | 167—55 |
| 2,985,560 | 5/61 | Homan et al. | 167—74 |
| 2,990,332 | 6/61 | Keating | 167—65 |
| 2,996,428 | 8/61 | De Jager | 167—74 |
| 3,013,944 | 12/61 | Jorpes | 167—74 |
| 3,066,075 | 11/62 | Deutsch | 167—65 |
| 3,100,738 | 8/63 | Cavallito | 167—82 |
| 3,108,042 | 10/63 | Murphy et al. | 167—58 |

FOREIGN PATENTS 1,031,467  6/53  France.

OTHER REFERENCES

"Bontril Timed #1–#2: Carboxymethylcellulose Salt of Dextro-Amphetamine, Carnrick," Modern Drugs, pages 1662–1663, July 1960.

"Bontril Timed-Product Brochure, Carnrick," Modern Drugs, pages 117–118, February 1961.

"Bontril Timed Tablets, Carnrick," Physicians Desk Reference, Fifteenth Edition (P.D.R. 15th ed.), pages 553–554, copyright 1960 by Medical Economics, Inc., Oradell, New Jersey.

Cavallito et al.: "Modification of Rates of Gastrointestinal Absorption of Drugs I. Amines," J. Am. Pharm. Assoc., vol. XLVII, No. 3, pp. 165–168, March 1958.

Kennon et al.: "Interaction Studies of Cationic Drugs with Anionic Polyelectrolytes I. Sodium Carboxymethylcellulose," J. Am. Pharm. Ass'n (Sci. ed.), volume XLV (No. 3), pages 157–160, March 1956.

Kennon: "Interaction Studies of Cationic Drugs with Anionic Polyelectrolytes II. Polyacrylic and Styrene Polymers." J. Am. Pharm. Ass'n (Sci. ed.), volume 46 (No. 1), pages 21–27, January 1957.

Kennon: "Interaction Studies of Cationic Drugs with Anionic Polyelectrolytes," Ph. D. Thesis, Univ. Wisconsin (1956), Dissertation Abstracts, volume 16, No. 10, page 1889, December 1956.

Swintosky et al.: "Properties and Applications of Powdered Polysaccharide Acids," J. Am. Pharm. Assoc., Sci. ed., volume 44, No. 2, pages 109–112, February 1955.

LEWIS GOTTS, *Primary Examiner*.

MORRIS O. WOLK, *Examiner*.